United States Patent

Harrison, III et al.

[15] 3,700,792

[45] Oct. 24, 1972

[54] COMPUTER ANIMATION GENERATING SYSTEM

[72] Inventors: Lee Harrison, III, Englewood; Francis J. Honey; Edwin J. Tajchman, both of Denver, all of Colo.

[73] Assignee: Computer Image Corporation, Denver, Colo.

[22] Filed: Dec. 4, 1969

[21] Appl. No.: 882,125

[52] U.S. Cl. ........................178/6.8, 315/18, 315/26, 340/324 A

[51] Int. Cl. ................................................H04n 3/30

[58] Field of Search ......340/324 A; 178/6.8; 315/18, 315/26

[56] References Cited

UNITED STATES PATENTS

| | | | |
|---|---|---|---|
| 3,483,426 | 12/1967 | Harrison | 315/18 |
| 3,501,669 | 3/1970 | Henderson | 315/18 |
| 3,364,382 | 1/1968 | Harrison | 178/6.8 X |
| 3,527,978 | 9/1970 | Harrison | 315/18 |
| 3,441,789 | 4/1969 | Harrison | 315/18 |

*Primary Examiner*—Robert L. Griffin
*Assistant Examiner*—Richard K. Eckert, Jr.
*Attorney*—Kingsland, Rogers, Ezell, Eilers & Robbins

[57] ABSTRACT

A system for automatically animating scenes viewed by a video camera and displaying the animated scenes. Animation can be collectively of the entire scene or separately of individual sections of the scene viewed by the video camera. Real time animation is selected from any of several pre-programmed animation sequences synchronized with the video camera.

29 Claims, 4 Drawing Figures

INVENTORS:
LEE HARRISON III
FRANCIS J. HONEY
EDWIN J. TAJCHMAN
ATTORNEYS

INVENTORS
LEE R. HARRISON, III
FRANCIS J. HONEY
EDWIN J. TAJCHMAN
BY Kingsland, Rogers, Ezell, Eilers & Robbins
ATTORNEYS

INVENTORS
LEE HARRISON III
FRANCIS J. HONEY
EDWIN J. TAJCHMAN

BY Kingsland, Rogers, Ezell, Eilers & Robbins
ATTORNEYS

INVENTORS:
LEE HARRISON, III
FRANCIS J. HONEY
EDWIN J. TAJCHMAN
BY Kenyon & Kenyon, Rogers, Ezell, Eilers & Robbins
ATTORNEYS

COMPUTER ANIMATION GENERATING SYSTEM

BRIEF DESCRIPTION OF THE INVENTION

The broad components of the system for displaying automatically animated scenes viewed by a video camera include a video camera that is trained to scan the static or dynamic scene that is to be animated, a cathode ray tube on which the animation is displayed, a section control network that selectively determines the sequence of animation of different sections of the scene and the relative sizes of the different sections, a synch-generator to synchronize the video camera with the animation sequences, a commutator network for controlling the positions of the cathode ray tube beam in animation sequences, an animation network having selective pre-programmed animation sequences, and ramp generators for causing horizontal and vertical sweep of the beam of the cathode ray tube. A rotation network permits selective rotation of the entire scene or of individual sections of the scene.

With the horizontal sweep of the cathode ray tube beam thought of as movement in the X direction and vertical movement of the beam thought of as movement in the Y direction, the ramp generators establish conventional horizontal and vertical movements of the cathode ray tube beam in the X and Y directions respectively. The rotational network has provisions for selectively modifying the signals produced in the ramp generators to cause the display to be rotated on the cathode ray tube. Rotation can be of the entire scene or of individual sections independently of other sections as programmed by an appropriate commutator network.

In the animation sequences, animation is imparted to the entire image or to one or more individual sections during selective time intervals. First, the scene to be animated is established such as from the output of a video camera that scans a subject scene, thus providing a direct scan input to the system. The animation begins from initial X and Y settings of the display and ends with final X and Y settings of the scene or individual segments of the scene. These initial and final settings may or may not correspond exactly to the output from the video camera. There are settings for initial X position and initial Y position and settings for final X position and final Y position. There are also settings for X and Y size which are maintained throughout the animation sequence. However, there are also settings for initial and final Z size, and these settings can indirectly vary size of the image in the X and Y directions from initial to final and during the animating interval therebetween.

The position of the scene or of individual sections of the scene is established by the combination of the initial X, Y position settings and the final X, Y position settings. The influence of initial X, Y position settings varies with time according to a ramp function and is also further modified by animation signals that selectively define the path of movement between the initial and final settings. The final X, Y position settings will establish the final position of the scene (or sections) when the effects of initial X, Y position settings and of the animation signals have been reduced to zero. Therefore, the characteristics of the ramp function can be set to establish the rate and duration of the transfer from initial to final X, Y positions. The path of movement between initial and final positions is determined by selection from a wide variety of animation signals.

Initial and final sizes of the scene, or sections, are set by adjusting initial and final Z settings. The same ramp function establishes the rate and duration of change from initial to final Z settings. Animation of this size change can be done with any of a wide variety of signals.

The relative effect of the animation signals depends upon their effective relative amplitudes. These amplitudes can be made to vary as functions of time in selective ways to further vary the animation.

The application of animation signals can also be selected for only some and not all of the parameters which define the scene or its sections. In this way, still further variations in the kinds of animation generated are possible.

Another feature of this invention is the capability of selectively separating the scene into individual sections. These sections can be individually positioned and individually animated. The kind and rate of animation can be separately established for each section.

Once all initial and final settings and animation programs for the scene or sections have been established, operation is controlled by a single control switch. Movement of the control switch to one position resets all parameters to initial settings and holds them there until the control switch is moved to its second position. Movement of the control switch to its second position initiates animation. Animation then takes place for the duration set by the ramp function. The ramp function reduces the effects of initial settings and of animation signals to zero, leaving the scene under the effects of the final settings. The scene and sections can be reset to initial settings by returning the control switch to its first position. Then the animation can be repeated by again moving the control switch to its second position. Alternatively, before another animation sequence, initial and final settings and/or animation controls may be adjusted for different initial, final and animation characteristics, thereafter followed by movement of the switch to its second position.

Animation can also be reversed by providing two ramp functions instead of one ramp function. One of the two ramp functions is out-going and the other ramp function is in-going. The ramp functions may be individually set for amplitude and duration. Then, with the aforesaid control switch held in its second position, switching to one ramp function produces animation from initial to final settings, and switching to the other ramp function reverses the animation from final to initial settings. Switching back and forth between the two ramp functions may proceed indefinitely.

From the foregoing it is apparent that the purpose of this system is to provide efficient and direct animation of two dimensional information within a three-dimensional volume, with the X and Y parameters establishing the two-dimensions corresponding to (but varied for animation from) the two-dimensional input, and the Z parameters providing animation in the third dimension. In these respects, the approach to animation in the present invention differs from that of U.S. Pat. No. 3,364,382.

The selection of initial and final positions and sizes is done manually and can be varied as desired by the operator. While different animation sequences are preprogrammed, selection from among the animation sequences is manual so that the operator can have flexibility of artistic creation.

The system of this invention incorporates frequency controls that enable all operations to be synchronized with the shutter frequency of a cinema camera. Accordingly, a cinema camera that is photographing the final animated display on the output cathode ray tube is synchronized with the frame rate of that display.

DETAILED DESCRIPTION OF THE INVENTION

Figure 4:
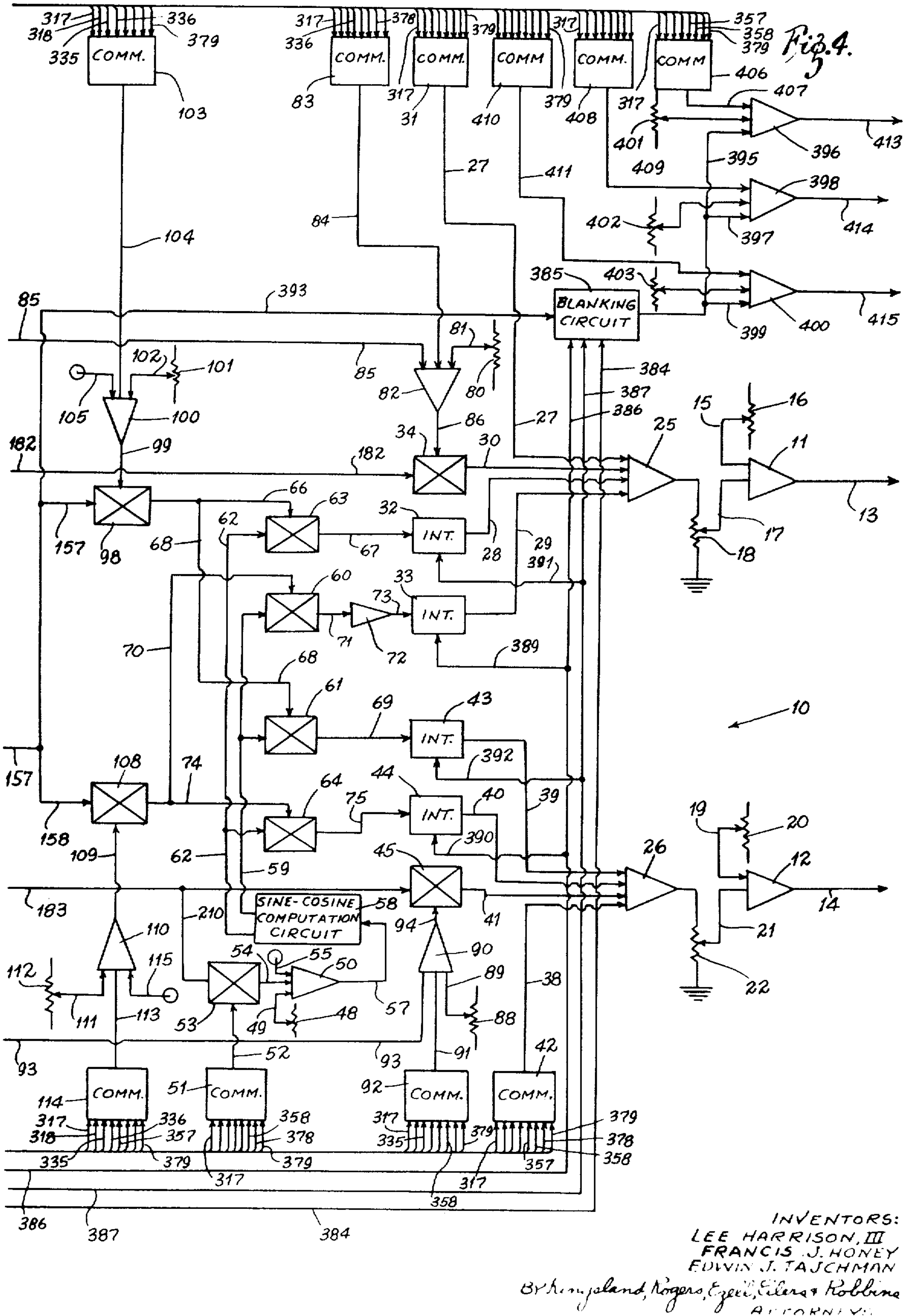
FIG. 4 is a schematic diagram of the remaining portions of the animation network.

Referring first to FIG. 4, the animation computer 10 has output summing amplifiers 11 and 12. Output conductors 13 and 14, respectively, from the summing amplifiers 11 and 12 carry signals that position the beam of the display cathode ray tube (not shown) in horizontal and vertical directions. The output conductor 13 carries signals representing the instantaneous location of the beam in a horizontal or X direction and the output conductor 14 carries signals that position the beam in the vertical or Y direction.

One input conductor 15 to the summing amplifier 11 leads from a manually variable potentiometer 16 for providing a variable voltage input proportional to final X position of the entire scene. Adjustment of the potentiometer 16 permits selective variation of the final position of the scene in the horizontal direction. Another input conductor 17 to the summing amplifier 11 leads from a manually adjustable potentiometer 18 that sets final X size for the entire scene. Adjustment of the potentiometer 18 permits adjustment of the width of the final scene.

Similarly, an input conductor 19 to the summing amplifier 12 leads from a manually adjustable potentiometer 20 for establishing final Y position of the entire scene. A conductor 21 to the summing amplifier 12 leads for a manually adjustable potentiometer 22 that sets the final Y size of the entire scene.

The potentiometer 18 is connected to the output of an X summing amplifier 25 and the potentiometer 22 is connected to the output of a Y summing amplifier 26. Four input conductors 27,28,29 and 30 lead to the X summing amplifier 25. The conductor 27 leads from a commutator 31 to deliver signals to the X summing amplifier 25 establishing final X positions of individual sections of the scene. The conductors 28 and 29 lead from integrators 32 and 33, the integrator 32 generating a horizontal-sweep ramp signal for the display beam in the X direction at the line frequency and the integrator 33 generating a horizontal-sweep ramp signal for the display beam in the X direction at the frame frequency. The conductor 30 leads from an animation multiplier 34 which functions in a manner to be described to supply signals for animation in the X direction to its output conductor 30.

There are four input conductors 38, 39, 40 and 41 to the Y summing amplifier 26. The conductor 38 leads from a final Y position commutator 42 and carries signals representing final Y position of the individual sections of the scene. The conductor 39 leads from an integrator 43 that generates a ramp signal establishing the sweep of the display beam in the vertical Y direction at the line frequency. The conductor 40 leads from an integrator 44 that generates a ramp signal establishing the sweep of the display beam in a vertical or Y direction at the frame frequency. The conductor 41 leads from a Y animation multiplier 45 that delivers output signals corresponding to animation in the Y direction.

The ramp generators 32 and 43 generate ramp signals at the horizontal line frequency, and the ramp generators 33 and 44 generate ramps at the frame frequency. The amplitudes of the ramps generated are direct functions of the input voltages which can be varied in a manner to be described as rotation or animation or both are imparted to the scene. Otherwise, the ramp generators generate ramp functions that define a normal rectangular raster for the beam of the display tube synchronized with that of the video camera.

To rotate the sweep of the display beam, a potentiometer 48 can be manually adjusted to select a voltage proportional to the angle of rotation. Assuming this angle of rotation as designated by $b$ and rotation of the X and Y coordinates is in a clockwise direction about the angle $b$ to new coordinates X' and Y', the formulas for X' and Y' are $X' = X \text{ cosine } b - Y \text{ sine } b$ and $Y' = X \text{ sine } b + Y \text{ cosine } b$, where $X$ and $Y$ are coordinates of the scene in the original horizontal and vertical reference coordinates of the display tube and $X'$ and $Y'$ are reference coordinates of the display tube and $X'$ and $Y'$ are coordinates of the scene rotated through the angle $b$.

The voltage corresponding to the angle $b$ is transmitted from the potentiometer 48 through a conductor 49 to an angle summing amplifier 50. This voltage carried by the conductor 49 sets the angle of rotation for the overall scene. Individual section angles of rotation may be derived from a commutator 51 having separate angle settings for individual sections of the scene. The commutator 51 is sequenced to operate in a manner to be described to produce output voltages in an output conductor 52 that leads to a multiplier 53. The output conductor 54 from the multiplier 53 also constitutes an input to the angle summing amplifier 50. Finally, another input conductor 55 to the angle summing amplifier 50 may lead from any other source of steady or time-varying signal sources for further varying the angle $b$.

A conductor 57 carries the output signal from the angle summing amplifier 50 to a sine-cosine computation circuit 58. One output from the sine-cosine computation circuit 58 is a signal corresponding to the sine of the angle $b$ and is delivered by a conductor 59 to separate multipliers 60 and 61. The other output from the sine-cosine computation circuit 58 corresponds to the cosine of the angle $b$ and is delivered by another conductor 62 to separate multipliers 63 and 64. Another input to the multiplier 63 is proportional to the instantaneous value of the size of X derived in a manner to be described and delivered by a conductor 66. Accordingly, the output from the multiplier 63 delivered by a conductor 67 to the integrator 32 is proportional to the value of *X* cosine *b*. A conductor 68 also delivers the signal proportional to he instantaneous value of *X* to the multiplier 61. The output from the multiplier 61 is proportional to *X* sine *b* and is delivered by a conductor 69 to the integrator 43.

A conductor 70 delivers a signal to the multiplier 60 that is proportional to the instantaneous value of the size of *Y*. The output from the multiplier 60 is proportional to *Y* sine *b* and is delivered by a conductor 71 to an inverter 72, the output from which is proportional to the value of (−*Y* sine *b*) and is delivered by a conductor 73 to the integrator 33. A conductor 74 delivers signals proportional to the instantaneous value of the size of *Y* to the multiplier 64. The output from the multiplier 64 is proportional to *Y* cosine *b* and is delivered by a conductor 75 to the integrator 44.

Thus, for rotation of the scene, or individual sections of the scene, ramp functions proportional to *X* cosine *b* and (−*Y* sine *b*) are combined in the *X* summing amplifier 25 to produce an output proportional to *X'* instead of *X*, and ramp functions proportional to *X* sine *b* and *Y* cosine *b* are combined in the *Y* summing amplifier 26 to produce an output proportional to *Y'* instead of *Y*.

Initial X position for the entire scene is manually set in a potentiometer 80 the output from which is delivered by a conductor 81 to a summing amplifier 82. Initial X positions for individual sections are set in a commutator 83 sequenced in a manner to be described to produce output proportional to the initial X positions of the individual sections as delivered by a conductor 84 to the summing amplifier 82. Another conductor 85 leading to the summing amplifier carries animation signals as will be described. A conductor 86 delivers the output signal from the summing amplifier 82 to the animation multiplier 34.

Similarly, a potentiometer 88 permits manual settings of initial Y position for the entire scene and a conductor 89 delivers this signal to a summing amplifier 90. Another conductor 91 leads from a commutator 92 in which initial Y positions are set for individual sections, sequenced in a manner to be described. A third conductor 93 leading to the summing amplifier 90 carries animation signals. The output from the summing amplifier 90 is delivered by a conductor 94 to the multiplier 45.

The signal carried in the conductor 66 that corresponds to instantaneous X size comes from an X size multiplier 98. One input to the X size multiplier 98 is delivered by a conductor 99 leading from an X size summing amplifier 100. A potentiometer 101 can be manually adjusted to set initial X size for the entire scene. The voltage set in the potentiometer 101 is delivered by a conductor 102 to the X size summing amplifier 100. X sizes for the individual sections are set in a commutator 103 sequenced as will be described to deliver voltages through a conductor 104 to the X size summing amplifier; these voltages are proportional to the X sizes of the individual sections. Another conductor 105 leading to the X size summing amplifier 100 may deliver arbitrary signals to vary X size.

The conductor 74 that carries signals corresponding to instantaneous values of Y size leads from a Y size multiplier 108. An input conductor 109 to the Y size multiplier 108 leads from a Y size summing amplifier 110. One input conductor 111 to the Y size summing amplifier 110 leads from a Y size potentiometer 112 that is manually adjustable to set the initial Y size of the entire scene. Another conductor 113 leading to the Y size summing amplifier 110 leads from an individual section Y size commutator 114 that establishes Y sizes for the individual sections and is sequenced in a manner to be described. A third input conductor 115 to the Y size summing amplifier 110 is connected to deliver arbitrary inputs to vary Y size as desired.

Voltage signals for producing animation are developed in three oscillators 120, 121 and 122. The oscillator 120 originates animation in the X direction. The oscillator 121 originates animation in the Y direction. Animation is also produced in a Z direction which is defined as being normal to the plane of the display cathode ray tube as defined by the X and Y coordinates. This Z direction animation is developed in the oscillator 122.

Signals from the X oscillator 120 are transmitted through a conductor 123 and a manually operable switch 124 to a multiplier 125 where the signals may be modified as will be described. The output conductor 126 from the multiplier 125 leads to an electronic switch 127 and thence to the conductor 85 that leads to the summing amplifier 82 for direct variation of the X signal. Signals from the Y oscillator 121 are delivered by a conductor 129 through a manually operable switch 130 to a multiplier 131. From the multiplier 131, the oscillator signals are transmitted through a conductor 132 to an electronic switch 133 and then by the conductor 93 to the summing amplifier 90 for direct variation of the Y signal.

The Z oscillator 122 produces signals to modulate the size of the display. This is done by the transmission of signals from the Z oscillator 122 through a conductor 136 and a manually operable switch 137 to a multiplier 138. From the multiplier 138, the signals are transmitted through a conductor 139, an electronic switch 140, and a conductor 141 to an initial Z summing amplifier 142. A second input to the initial Z summing amplifier is a basic Z signal transmitted from a potentiometer 143 through a conductor 144. The potentiometer 143 is manually adjustable to set an initial Z value for the entire display. A third input to the initial Z summing amplifier is transmitted by a conductor 145 from a commutator 146 that is sequenced in a manner to be described to generate initial Z voltages for the individual sections of the display. The output from the initial Z summing amplifier 142 is transmitted through a conductor 148 to a Z animation multiplier 149. The output from the Z animation multiplier 149 is delivered by a conductor 150 to a final Z summing amplifier 151.

Another input to the final Z summing amplifier comes from a final Z potentiometer 152 that is manually adjustable to set a final Z value for the entire display. This signal is transmitted to the final Z summing amplifier through a conductor 153. Another input to the final Z summing amplifier 151 comes from a conductor 154 leading from a commutator 155 that is sequenced to deliver final Z values for the individual sections of the display. The output from the final Z summing amplifier 151 is delivered by a conductor 157 to the X-size multiplier 98 and by a conductor 158 to the Y size multiplier 108. In this way, the signals from the Z oscillator 122 modulate X and Y indirectly by modulating the gains in the X and Y size multipliers 98 and 108.

Animation sequence of the entire display is controlled by a sequence ramp generator 164 or, or individual sections of the display, by a commutator 165 that transmits a separate ramp voltage for each section of the display. These additional ramp voltages would be generated by separate ramp generators similar to the sequence ramp generator 164. The sequence ramp generator 164 generates a ramp voltage with the time duration and polarity depending upon the setting of a switch 166 between a potentiometer 167 for a positive going ramp and a potentiometer 168 for a negative going ramp. Another switch 169 connected to the sequence ramp generator 164 is movable between a grounded terminal 170 that resets the sequence ramp generator and holds it in reset as long as the switch is in contact with it, and another switch terminal 171 that is connected to deliver a +5 volt steady signal to the sequence ramp generator for operation.

The sequence ramp generator 164 has an output conductor 172 and the commutator 165 has an output 173. A manually operable switch 174 permits selection between the sequence ramp generator 164 and the commutator 165.

The ramp signals are delivered by a conductor 176 to an inverter amplifier 177 where the ramp is inverted. The inverted ramp is delivered by a conductor 178 to a sequence control summing amplifier 179. The animation control voltage of the sequence control summing amplifier 179 is set by a potentiometer 180 that is manually adjustable to deliver a control voltage through a conductor 181 to the summing amplifier 179. The output from the sequence control summing amplifier 179 is transmitted by a conductor 182 to the X animation multiplier 34 and by a conductor 183 to the Y animation multiplier 45.

Another conductor 184 delivers the output from the sequence control summing amplifier 179 to the Z animation multiplier 149.

The ramp signals from the sequence ramp generator 164 (or the commutator 165) are also transmitted through a conductor 187 to a manually operable switch 188. When the switch 188 is in the position shown in the drawing, connected to the conductor 187, it transmits the ramp voltage through a conductor 189 to the final Z summing amplifier 151. Alternatively, the switch 188 can be moved into contact with a switch terminal 190 that is connected to deliver a steady +10 volt signal.

A switch 192 can be manually shifted between a terminal 193 that delivers inverted ramp signals from the inverter -amplifier 177 and a terminal 194 that is connected to deliver the steady +10 volt signal from the conductor 191. The switch 192 is connected by a conductor 196 to input conductors 197, 198 and 199 to the X, Y and Z multipliers 125, 131 and 138 respectively.

The voltage output from the Z multiplier 138 is delivered through a conductor 202 to a potentiometer 203 so that a small portion of the Z oscillator signal can be supplied by a conductor 204 for mixture with the X oscillator signal. The output from the Z multiplier 138 is also delivered by a conductor 205 to a potentiometer 206. A small portion of the Z voltage can then be delivered by a conductor 207 for mixture with the Y oscillator signals. This mixing of Z oscillator signals with the X and Y oscillator signals compensates for resetting of the integrators to zero and makes Z animation symmetrical.

From the foregoing, it is apparent that initial Z values produced in the initial Z summing amplifier 142 are established by the setting of the potentiometer 143, the settings for initial Z values of the individual sections produced in the commutator 146, and the output from the Z multiplier 138. This output from the multiplier 138 varies in proportion to the amplitude of the ramp voltage produced in the sequence ramp generator 164 since that inverted ramp voltage coming from the inverter amplifier 177 is transmitted from the conductor 178, the switch 192, the conductors 196 and 197, and the conductor 199 to control the gain of the multiplier 138. The inverted ramp signal as modified by the animation multiplier control voltage produced in the potentiometer 180 is transmitted from the sequence control summation amplifier 179 through the conductor 184 to control the gain of the Z animation multiplier 149. Therefore, at the beginning of the animation interval, the gain of the multiplier 149 is unity and gradually changes to zero at the end of the animation interval. When the gain of the multiplier 149 reaches zero, it no longer produces an output to affect the final Z summing amplifier 151. Therefore, final Z at the end of the animation sequence is a function only of the final Z signal produced by the setting of the potentiometer 152, the individual section Z values established by the commutator 155, and whatever voltages are carried by the conductor 189 according to the setting of the switch 188. If the switch 188 is in the position shown, connected to the conductor 187 leading from the output of the sequence ramp generator 164 (or of the commutator 165) the conductor 189 will be carrying a unity gain signal at the end of the non-inverted ramp. If the switch 188 is in contact with the switch terminal 190, the conductor 189 will continue to carry the steady state +10 volt signal delivered by the conductor 191.

During the animation sequence, the inverted ramp from the sequence control summation amplifier 179 is also transmitted by the conductors 182 and 183 to the X and Y animation multipliers 34 and 45. Therefore, these X and Y animation multipliers 34 and 45 have maximum gain at the start of the animation sequence and gradually reduce to zero gain at the end of the animation sequence. A conductor 210 also delivers this inverted ramp signal to the angle of rotation multiplier 53 to control the gain of that multiplier.

A control 211 from the sequence ramp generator 164 to the electronic switches 127, 133 and 140 causes these switches to open when the sequence ramp reaches its end point. This disconnects the X, Y and Z oscillators 120, 121 and 122 to eliminate any spurious signals that might cause jitter of the display at the end of the animation sequence.

Figure 1:
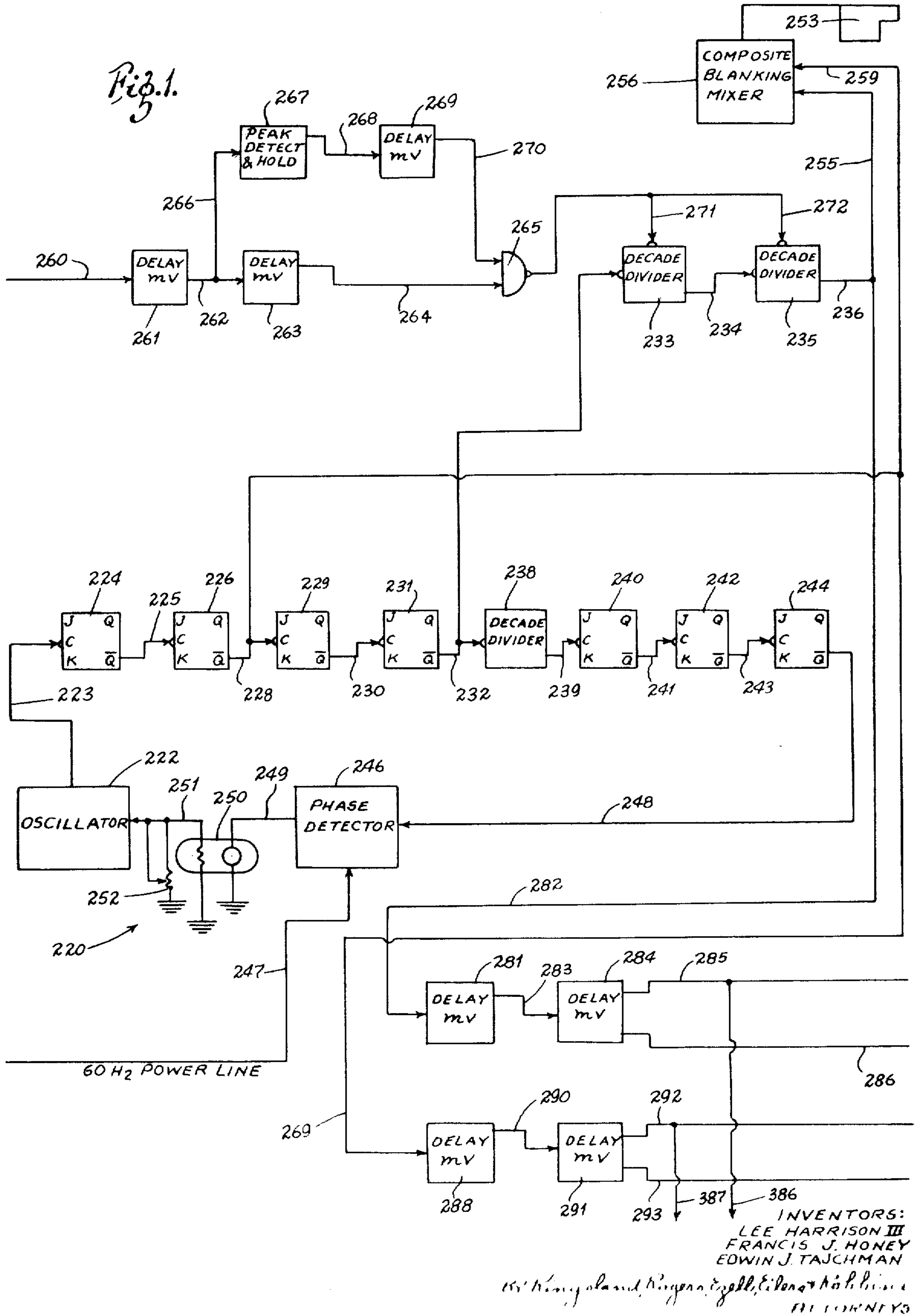
FIG. 1 is a schematic diagram of the synch generator.

FIG. 1 illustrates the synch generator section 220 of the timing control. The synch generator section 220 includes an oscillator 222 that generates a 76.8 kHz signal. The output from the oscillator 222 is delivered by a conductor 223 to a flip-flop 224, the output conductor 225 of which carries a signal that is half the frequency of the input, or 38.4 kHz. This 38.4 kHz signal is delivered by the conductor 225 to another flip-flop 226 that again halves the frequency to 19.2 kHz, the line frequency of the display cathode ray tube.

An output conductor 228 from the flip-flop 226 carries the 19.2 kHz signal to a flip-flop 229 where the frequency is halved to 9.6 kHz as delivered by a conductor 230 to a flip-flop 231. The output from the flip-flop 231 is a 4.8 kHz signal delivered by a conductor 232 to a decade divider 233. The decade divider 233 divides its input 4.8 kHz signal by 10, producing an output signal of 480 Hz which is delivered by a conductor 234 to another decade divider 235. An output conductor 236 from the decade divider 235 carries a 48 Hz signal, which is the frame frequency of the cathode ray tube display. These frequencies are selected to maintain compatibility with the shutter frequency of standard cinema cameras.

The conductor 232 also carries the 4.8 kHz signal to a decade counter 238 where the input frequency is divided by 10 to produce a 480 Hz output delivered by a conductor 239 to a flip-flop 240. The output from the flip-flop 240 is a 240 Hz signal delivered by a conductor 241 to another flip-flop 242. The output from the flip-flop 242 is a 120 Hz signal carried by a conductor 243 to a flip-flop 244, the output of which is a 60 Hz signal, or line frequency.

A phase detector 246 has one input 247 that constitutes the 60 Hz power line 247. The other input conductor 248 to the phase detector 246 carries the 60 Hz signal from the flip-flop 244. The output from the phase detector 246 varies in proportion to the difference between the two input frequencies. This output signal is delivered by a conductor 249 to a Raysistor 250 which converts it input voltage to resistance changes applied through a conductor 251 to the oscillator 222. Any difference between the power line frequency and the 60 Hz signal in the conductor 248 will adjust the frequency of the oscillator 222 to a value of precisely 1,280 times 60 Hz, or 76.8 kHz. A potentiometer 252 is a manual control for frequency adjustments.

The cinema camera (not shown) which may be used to photograph the final display generated by this network has a conventional 60 Hz synchronous motor drive. The 48 Hz output from the decade divider 235 is delivered by a conductor 255 to a composite blanking mixer 256 that is connected to control the video camera 253. The 48 Hz signal maintains synchronism with the cinema camera. A conductor 259 also delivers the 19.2 kHz signal to the composite blanking mixer 256. The combination of the 48 Hz signal and the 19.2 kHz signal and the composite blanking mixer 256 provides a composite synchronizing signal for the video camera 253.

The circuit in the cinema camera senses the shutter position and applies a 24 Hz signal by way of a conductor 260 to a delay multivibrator 261. An output pulse from the delay multivibrator 261 is transmitted by a conductor 262 to another delay multivibrator 263 which produces an output pulse in its output conductor 264 delayed an arbitrary amount from its triggering signal. The pulse carried by the conductor 264 is transmitted to an AND gate 265.

The output from the delay multivibrator 261 is also delivered by a conductor 266 to a peak-detector-and-hold circuit 267. The peak-detector-and-hold circuit 267 has a short charge period and a long discharge period. Its output is delivered by a conductor 268 to a delay multivibrator 269 that produces an output pulse 40 milliseconds long which is transmitted through a conductor 270 to the AND gate 265.

When the cinema camera is started, a series of pulses from the delay multivibrator 261 corresponding to shutter openings charge the peak-detector-and-hold circuit 267 in steps until the output voltage in the conductor 268 exceeds the threshhold of the delay multivibrator 269. The delay multivibrator 269 is then triggered to produce the 40 millisecond pulse. Since the peak-detector-and-hold circuit 267 remains charged as long as the cinema camera continues to run, a single pulse is generated by the delay multivibrator 269 each time the cinema camera is started, but the single pulse is delayed from the start to enable the synchronous motor of the camera to build up to full speed. Coincidence of pulses in the conductors 270 and 264 produces an output from the AND gate 265 which is delivered by conductors 271 and 272 to reset the decade dividers 233 and 235. Thus these decade dividers 233 and 235 are reset in coincidence with the opening of the shutter each time the cinema camera is started.

Figure 2:
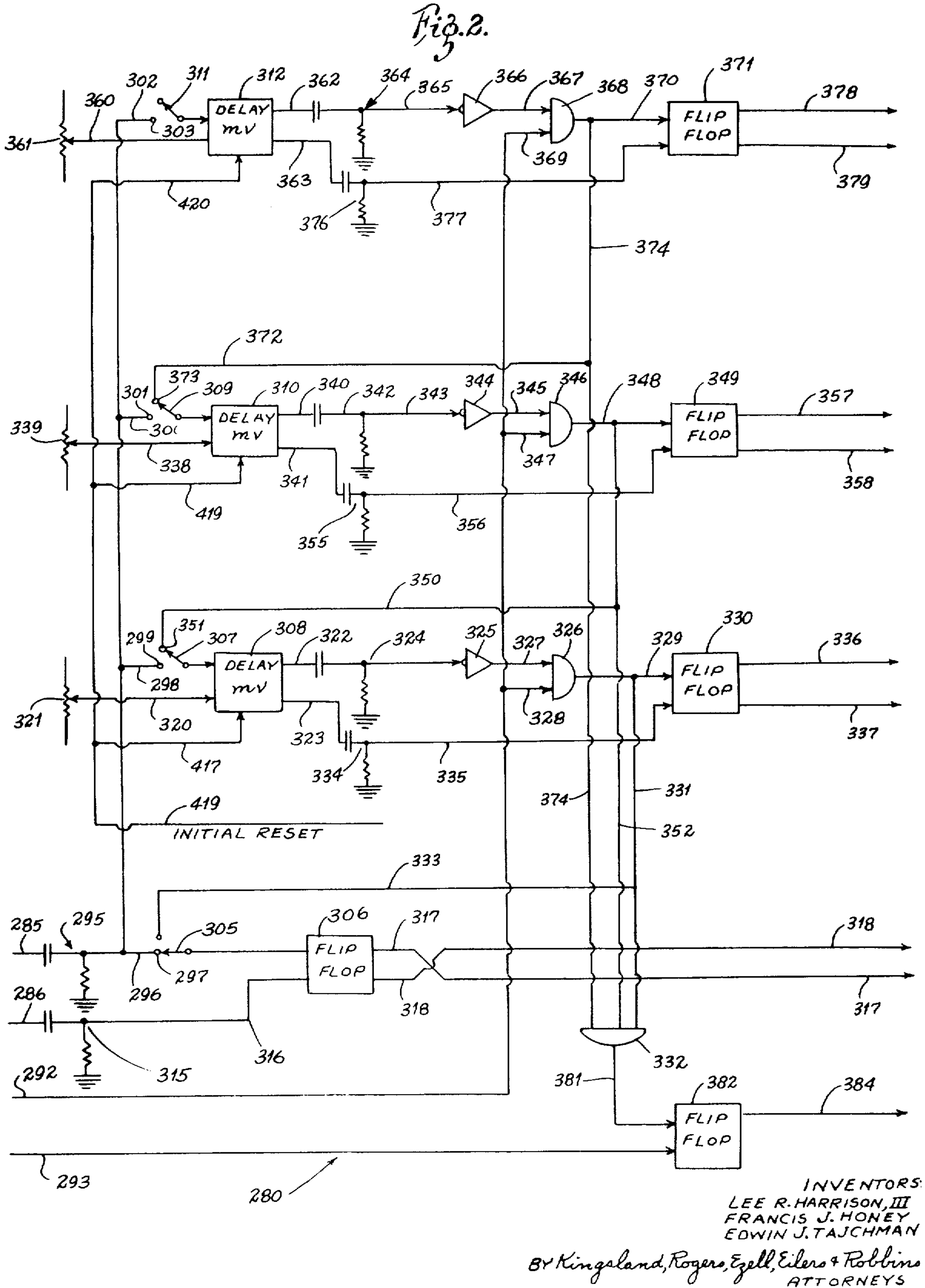
FIG. 2 is a schematic diagram of the section control network.
Figure 3:
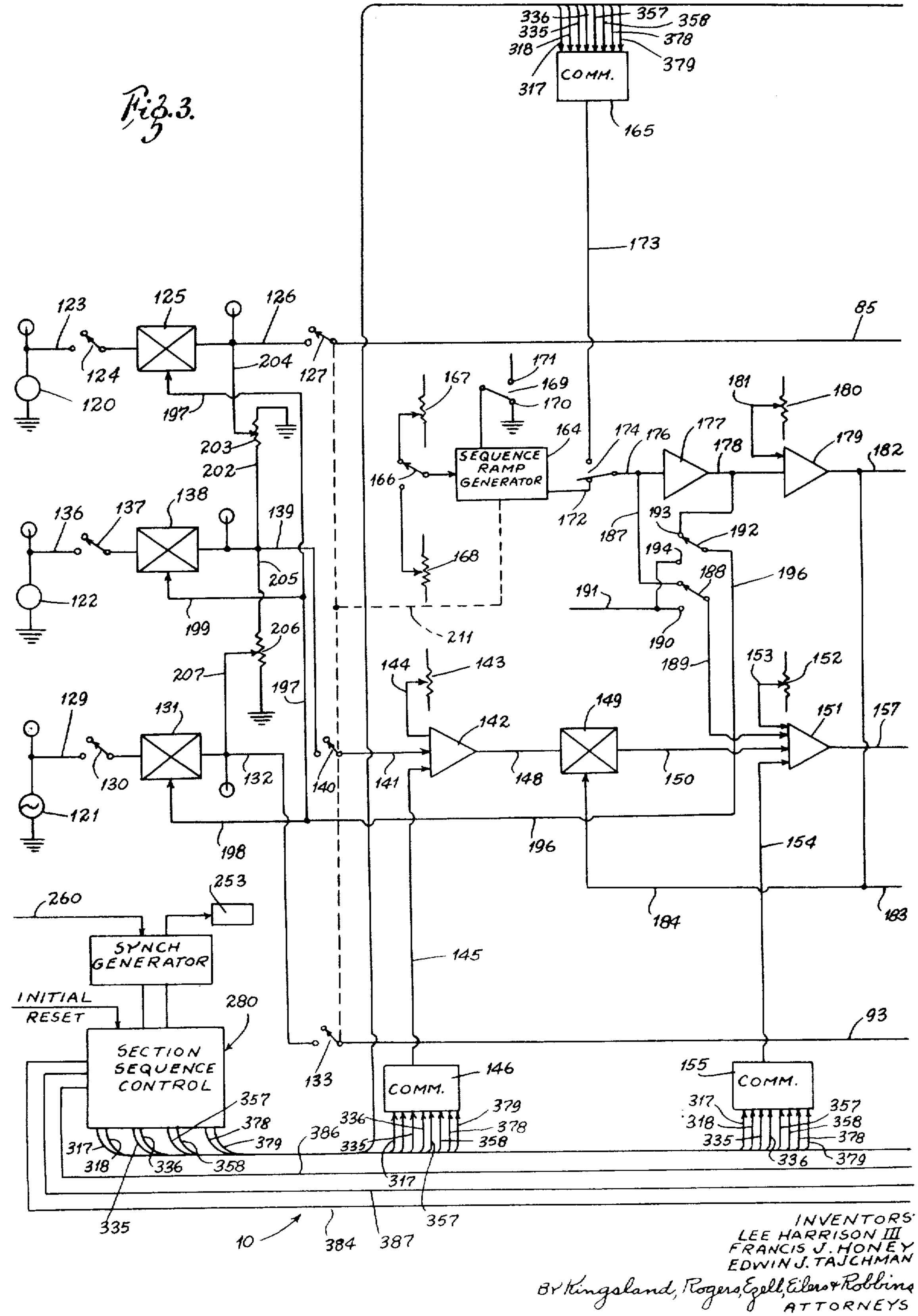
FIG. 3 is a schematic diagram of portions of the animation network.

The section sequence control network 280 illustrated in FIG. 2 has a delay multivibrator 281 that receives the 48 Hz signal by way of a conductor 282. The output from the delay multivibrator 281 is transmitted by a conductor 283 to another delay multivibrator 284. One output conductor 285 from the delay multivibrator 284 carries a variable width vertical reset pulse synchronized with the 48 Hz signal but delayed from it an arbitrary period. The other output conductor 286 from the delay multivibrator 284 carries an inverted vertical reset pulse synchronized with the 48 Hz signal but also delayed from it an arbitrary period.

A delay multivibrator 288 receives the 19.2 kHz signal by way of a conductor 289. The output from the delay multivibrator 288 is delivered by a conductor 290 to another delay multivibrator 291. One output conductor 292 from the delay multivibrator 291 carries a variable width horizontal reset pulse synchronized with the 19.2 kHz signal but delayed from it an arbitrary period. The other output conductor 293 from the delay multivibrator 291 carries a variable width inverted horizontal reset pulse synchronized with the 19.2 kHz signal but delayed from it an arbitrary period.

The vertical reset pulse in the conductor 285 is differentiated in a differentiator network 295. The differentiated pulse is delivered by a conductor 296 to a switch terminal 297, by a conductor 298 to a switch terminal 299, by a conductor 300 to a switch terminal 301, and by a conductor 302 to a switch terminal 303. A switch arm 305 is movable into contact with the switch terminal 297 to transmit the differentiated pulse to a flip-flop 306. A switch arm 307 is movable into contact with the switch terminal 299 to transmit the differentiated pulse to a delay multivibrator 308. A switch arm 309 is movable into contact with the switch terminal 301 to deliver the differentiated pulse to a delay multivibrator 310. A switch arm 311 is movable into contact with the terminal 303 to deliver the differentiated pulse to a delay multivibrator 312. There may be additional delay multivibrators like the delay multivibrators 308, 310 and 312 according to the number of individual sections that are to be individually animated.

The inverted vertical reset pulse is transmitted by the conductor 286 to a differentiating network 315. The resulting differentiated pulse is transmitted by a conductor 316 to the flip-flop 306. One output conductor 317 from the flip-flop 306 transmits a signal when flip-flop 306 receives the differentiated trailing edge of the vertical reset pulse through the switch 305. Another output conductor 318 from the flip-flop 306 transmits a signal when the flip-flop 306 receives the differentiated pulse in the conductor 316 corresponding to the leading edge of the inverted vertical reset pulse.

The delay multivibrator 308 has an input conductor 320 for establishing the duration of the output of the delay multivibrator 308 according to the setting of a manually adjustable potentiometer 321. The delay multivibrator 308 has an output conductor 322 carrying the variable width output pulse and an output conductor 323 carrying the inverted output pulse. The signal in the conductor 322 is differentiated in a differentiator 324 and the differentiated pulse passes through an inverter 325 to an AND gate 326 by way of a conductor 327. Another input to the AND gate 326 is by a conductor 328 carrying the horizontal reset pulse from the delay multivibrator 291. The output from the AND gate 326 is transmitted by a conductor 329 to a flip-flop 330, and by a conductor 331 to an OR gate 332 and by a conductor 333 to the switch 305.

The signal carried in the conductor 323 is delivered to a differentiating network 334 and thence by a conductor 335 as another input to the flip-flop 330. The flip-flop 330 has two output conductors 336 and 337.

A conductor 338 leads to the delay multivibrator 310 from a manually variable potentiometer 339. The potentiometer 339 is adjustable to set the duration of the output from the delay multivibrator 310. The delay multivibrator 310 has two output conductors 340 and 341. The signal in the conductor 340 passes through a differentiating network 342 and then to a conductor 343 leading to an inverter 344. The output from the inverter 344 is delivered by a conductor 345 to an AND gate 346. Another input conductor 347 to the AND gate 346 leads from the delay multivibrator 291 and carries the horizontal reset pulse. The output from the AND gate 346 is delivered by a conductor 348 to a flip-flop 349. The output from the AND gate 346 is also delivered by a conductor 350 to a switch terminal 351 opposite the switch arm 307 on the input side of the delay multivibrator 308 and is delivered by a conductor 352 to the OR gate 332.

The output conductor 341 leads to a differentiating network 355. The differentiated signal is carried by a conductor 356 to the flip-flop 349. The flip-flop 349 has two output conductors 357 and 358.

An input conductor 360 leading to the delay multivibrator 312 is connected from a manually adjustable potentiometer 361 for setting the duration of the output from the delay multivibrator 312. The delay multivibrator 312 has two output conductors 362 and 363. The conductor 362 leads to a differentiating network 364. From the differentiating network 364, a conductor 365 leads to an inverter 366 the output of which is connected by a conductor 367 to an AND gate 368. Another input conductor 369 to the AND gate 368 carries the horizontal reset pulse from the delay multivibrator 291. The output from the AND gate 368 is transmitted through a conductor 370 to a flip-flop 371, and also through another conductor 372 to a switch terminal 373 opposite the switch arm 309 on the input side of the delay multivibrator 310, and through a conductor 374 to the OR gate 332.

The conductors 317 and 318 from the flip-flop 306, 336 and 337 from the flip-flop 330, 357 and 358 from the flip-flop 349, and 378 and 379 from the flip-flop 371 lead to all the commutators 146, 155, 114, 51, 92, 42, 165, 103, 83, 31, 410, 408, and 406 for section control.

The other output conductor 363 from the delay multivibrator 312 leads through a differentiating network 376 to a conductor 377 leading to the flip-flop 371. The flip-flop 371 has two output conductors 378 and 379.

An output conductor 381 from the OR gate 332 leads to a flip-flop 382. The other input to the flip-flop 382 is the conductor 293 carrying the inverted horizontal reset pulse from the delay multivibrator 291. An output conductor 384 from the flip-flop 382 leads to a blanking circuit 285 shown in FIG. 4. Other inputs to the blanking circuit 385 are a conductor 386 carrying the vertical reset pulse from the delay multivibrator 284 and a conductor 387 carrying the horizontal reset pulse from the delay multivibrator 291. The vertical reset pulse is also transmitted through a conductor 389 to the integrator 33 and through a conductor 390 to the integrator 44. The horizontal reset pulse is delivered to the integrator 32 through a conductor 391 and to the integrator 43 through a conductor 392. Another input conductor 393 to the blanking circuit 385 is connected to the output of the final Z summing amplifier 151.

The blanking circuit 385 delivers voltages through a conductor 395 to a red intensity summing amplifier 396, through a conductor 397 to a blue intensity summing amplifier 398, and through a conductor 399 to a green intensity summing amplifier 400. Potentiometers 401, 402 and 403 leading to the summing amplifiers 396, 398 and 400, respectively, set overall color. A section commutator 406 sets color for the individual sections through a conductor 407 leading to the red intensity summing amplifier 396 to set section color in the red intensities. A commutator 408 is connected by a conductor 409 to the blue intensity summing amplifier 398 to set section color in the blue intensities. A commutator 410 is connected by a conductor 411 to the green intensity summing amplifier 400 to set section color in the green intensities. The output conductors 413, 414 and 415 from the red, blue and green intensity summing amplifiers 396, 398 and 400, respectively, lead to the red, blue and green intensity grids of a color cathode ray tube.

A conductor 419 is connected to a reset signal source. The reset signal is transmitted by a conductor 417 to the delay multivibrator 308, by a conductor 419 to the delay multivibrator 310, and by a conductor 420 to the delay multivibrator 312.

OPERATION

For animation of the entire scene, the switch arm 305 is moved in contact with the switch terminal 297, the switch arm 307 is moved in contact with the terminal 351, the switch arm 309 is moved in contact with the terminal 373, and the switch arm 311 is moved out of contact with the terminal 303. The differentiating network 295 differentiates the trailing edge of the vertical reset pulse carried by the conductor 285 and transmits this differentiated pulse to the flip-flop 306. The output from the flip-flop 306 is transmitted by the conductor 317 to all the commutators 146, 155, 114, 51, 92, 42, 165, 103, 83, 31, 410, 408 and 406, switching all those commutators to first section parameters corresponding to animation of the entire scene. Animation takes place for the duration between the end and beginning of the vertical reset pulse output from the delay multivibrator 284. When the leading edge of the next vertical reset pulse is differentiated in the differentiating network 315, the resulting pulse is transmitted through the conductor 316 to the other input of the flip-flop 306, producing an output in the conductor 318 to end the period of animation. This conductor 318 is also connected to all of the commutators.

For two section animation, the switch 305 is moved into contact with the conductor 333 and the switch 307 is moved into contact with the switch terminal 299. The other switches 309 and 311 are left in their previously set positions. The differentiated trailing edge of the vertical reset pulse is delivered by the conductor 298 through the switch 307 to the delay multivibrator 308, generating a variable-width output pulse the duration of which is set by the potentiometer 321. The leading edge of the inverted output pulse, as differentiated in the differentiating network 334, is transmitted by the conductor 335 to the flip-flop 330, changing the state of the flip-flop 330 and causing a signal to be transmitted through the conductor 337 to all the commutators to begin second section animation. The second section parameters continue animation of the second section until termination of the output pulse from the delay multivibrator 308. The trailing edge of this output pulse is differentiated in the differentiating network 324, inverted in the inverter 325 and transmitted through the conductor 327 to the AND gate 326. When a horizontal reset pulse from the delay multivibrator 291 is transmitted through the conductor 328 to the AND gate 326, a signal is transmitted from the AND gate through the conductor 329 to again change the state of the flip-flop 330 and deliver a signal through the conductor 336 to all the commutators, ending the animation of the second section. The pulse from the AND gate 326 is sufficiently long to remain for several horizontal reset pulses transmitted to the conductor 328, and the AND gate 326 therefore passes a signal when the first of these horizontal reset pulses reaches the conductor 328 following a signal in the conductor 327.

The signal from the AND gate 326 is also transmitted through the conductor 331 to the OR gate 332 and on to the flip-flop 382, producing a signal in the conductor 384 leading to the blanking circuit 385 to blank the display cathode ray tube during switching between sections. This blanking will remain until the next inverted horizontal reset pulse in the conductor 293 again changes the state of the flip-flop 382 to terminate blanking. The AND gate 326 assures that switching between sections two and one is possible only at the conclusion of a horizontal line.

The signal from the AND gate 326 which was transmitted to the OR gate 332 to cause blanking of the cathode ray tube is also transmitted during blanking by way of the conductor 333 and the switch 305 to the flip-flop 306, changing the state of the flip-flop 306 to start the section one parameters as described. The conclusion of the section one animation is triggered by the presence of a signal in the conductor 316 to change the state of the flip-flop 306.

For three section animation, the switch 305 is left in contact with the conductor 333, the switch 307 is moved into contact with the switch terminal 351, the switch 309 is moved into contact with the terminal 301, and the switch 311 is left in its previously set position. Section three animation then starts when the delay multivibrator 310 and proceeds as described for section two animation. The sequence is section three animation, section two animation, and section one animation.

For four section animation, the switches 305 and 307 are not changed. The switch 309 is moved back into contact with the terminal 373, and the switch 311 is moved into contact with the terminal 303. Now, animation begins with section four by the delivery of a signal to the delay multivibrator 312. Section four animation is identical to sections three and two. The sequence is now section four animation with the network that includes the delay multivibrator 312 followed by section three animation with the network which includes the delay multivibrator 310, then section two animation, followed by section one animation. As already stated, additional networks may be provided for any number of sections.

Different modes of animation are determined by the settings of the switch 169, the switch 166, the switch 192, and the switch 188. Mode one animation is a zoom effect animation in which a small initial image grows to a large final image. With the switch 169 in contact with the terminal 170, the sequence ramp generator 164 is maintained in its reset condition and no ramp generated. The switch 166 is in a position to receive the signal from the potentiometer 167 the setting of which determines the duration of the ramp. The switch 192 is set in contact with the terminal 194, and the switch 188 is set in contact with the conductor 187.

To start the animation, the switch arm 169 is moved into contact with the terminal 171. This initiates the generation of a ramp voltage in the sequence ramp generator 164 which is transmitted to the inverter amplifier 177 where the ramp is inverted. The inverted ramp is transmitted to the sequence control summation amplifier 179 where it is combined with the control voltage set in the potentiometer 180, and the output transmitted by the conductors 182 and 183 establishes the gain in the X and Y animation multipliers 34 and 45, and, through the conductor 184, to the Z animation multiplier 149. These gains begin at unity and reach zero at the end of the ramp generated by the sequence ramp generator 164.

The ramp voltage is also transmitted through the conductor 187 and the switch arm 188 to the final Z summing amplifier 151 to control initial image size.

Since the level of the inverted ramp changes from unity towards zero, the gains of the X, Y and Z animation multipliers 34, 45 and 149 decrease. Hence, the initial X, Y and Z voltages have a diminishing influence on the image displayed. Also, the amplitude of the animation originating from the X, Y and Z oscillators 120, 121 and 122 diminishes.

At the end of the ramp generated by the sequence ramp generator 164, gains of the X, Y and Z animation multipliers 34, 45, and 149 are zero. To assure this, the sequence ramp generator 164 operates through the circuit connection 211 to open the electronic switches 127, 133 and 140 to disconnect the X, Y and Z oscillators 120, 121 and 122 and prevent any spurious jitter from affecting the stability of the display subsequent to animation.

The foregoing animation sequence occurs between settings for initial Z and Y position and final X and Y position. As already explained, X and Y sizes are set for the entire scene by the settings of the manually operable potentiometers 101 and 112. X and Y positions for the individual sections are set by the commutators 103 and 114. Initial X and Y positions for the entire scene are set by the potentiometers 80 and 88. Initial X and Y positions for the individual sections are set by the commutators 83 and 92. Animation of the image of the entire scene or of individual sections begins and occurs from these initial settings.

Final size of the entire scene is set by the potentiometer 18 and the potentiometer 22. Final position for the individual sections is set by the commutator 31 and the commutator 42. Final position for the entire scene is set by the potentiometer 16 and the potentiometer 21.

For mode two animation, the switch 188 is moved into contact with the terminal 190 which delivers a steady state +10 volt signal to the final Z summing amplifier 151. Accordingly, in the mode, size is not affected by the sequence ramp voltage generated by the sequence ramp generator 164, and animation consists of translations and distortions caused by the X, Y and Z oscillators 120, 121 and 122.

In mode three animation, the switch 188 is moved into contact with the conductor 187. The switch 192 is moved into contact with the terminal 193. Now, the inverted ramp from the output conductor of the inverter amplifier 178 is transmitted through the switch arm 192 and the conductor 196 to the X, Y and Z multipliers 125, 131 and 138, increasing the gains of those multipliers from zero at the start of the ramp voltage to unity at the end of the ramp. Simultaneously, the gains of the X, Y and Z animation multipliers 34, 45 and 149 are decreasing from unity to zero. The overall effect is zero animation at the beginning of this animation sequence, moving to maximum animation at the mid point of the animation sequence, and ending in zero animation at the end of the animation sequence.

For mode four animation, the switch arm 169 is left in contact with the terminal 171 which delivers a +5 volt signal. The switch arm 192 is put in contact with the terminal 194, and the switch arm 188 is put in contact with the terminal 190. During animation, the switch arm 166 is moved back and forth between contact with the potentiometer 167 and the potentiometer 168. When the switch arm 166 is in contact with the potentiometer 167, an outgoing ramp is generated as times by the setting of the potentiometer 167. When the switch arm 166 is in contact with the potentiometer 168, an ingoing ramp is generated for a duration set by the potentiometer 168. The result is a zooming effect when the switch arm 166 is in contact with the potentiometer 167, and a reverse zooming effect when the switch arm 166 is in contact with the potentiometer 168, for individually selected time durations. Thus, as the switch arm 166 is moved back and forth, the animation occurs from the initial size and position setting to final size and position setting and then back in the reverse direction to the initial size and position settings.

The conductor 393 that delivers the output signal from the final Z summing amplifier 151 to the blanking circuit 385 adjusts the intensity of the display beam in inverse proportion to the size of the image being displayed. This tends to keep the proportional intensity level of the display constant during zooming.

The manually operable switches 124, 130 and 137 permit individual in and out connections of the oscillator signals from the X, Y and Z oscillators 120, 121 and 122. By operation of these switches, further modifications of the animation sequences are possible. In addition, the entire scene or individual sections of the scene can be rotated according to the setting of the basic angle potentiometer 48 as modified by the signal in the manually adjustable signal source 55 and/or by the commutator 51. This operation has already been described.

The foregoing description has set forth frequencies of operation to synchronize with the shutter frequency of a cinema camera. However, the final cathode ray tube display may be recorded on video tape rather than by a cinema camera. In the latter case, the 60 Hz signal output from the flip-flop 244 of FIG. 1 would be used as the synchronizing signal fed to the composite blanking mixer 256. The video camera trained on the output cathode ray tube would operate at 60 Hz power line frequency so synchronization would be maintained. The devices for producing the 48 Hz signal could be eliminated.

Various changes and modifications may be made within the purview of this invention as will be readily apparent to those skilled in the art. Such changes and modifications are within the scope and teaching of this invention as defined by the claims appended hereto.

What is claimed is:

1. A system for producing animated images of a static or dynamic scene comprising a video camera for scanning the scene to be animated and for producing video signals representing the scene, a display device for displaying the animated image, the display device having deflection and video inputs, means for establishing deflection signals defining initial position of the displayed image, means for establishing deflection signals defining final position of the displayed image, means to modulate any or all the deflection signals for selective animated movement between initial and final positions of the displayed image, the generation of the deflection signals being synchronized with the generation of the video signals from the video camera representing the scene, and means for applying the video and modulated deflection signals to the video and deflection inputs respectively of the display device to produce a display of the animated image.

2. The system of claim 1 wherein the modulating means includes means to modulate signals defining the entire display and means to modulate signals defining individual sections of the display.

3. The system of claim 1 wherein the display device comprises a cathode ray tube having a movable beam, the system including means for controlling the scanning pattern of the display tube beam, and means to apply signals to the controlling means proportional to angles of rotation to rotate the display on the display tube.

4. The system of claim 1 including means for adding voltages to the deflection signals to rotate the display.

5. A system for producing an animated display of a subject comprising a display device, the display device having a movable beam and horizontal and vertical controls for regulating the horizontal and vertical sweeps of the movable beam, means to establish intensity modulations and sweep program signals for the beam of the display device corresponding to reproduction of the subject in select individual sections, means to generate animation signals, means to combine the animation signals with the sweep program signals to animate the display, and means to vary the horizontal and vertical controls to position the display beam for separate animation of the individual sections of the subject.

6. The system of claim 5 including means to program separate forms of animation signals, and means to selectively combine one or more of the animation signal forms with the sweep program signals.

7. The system of claim 6 wherein the sweep program signals include signals defining the size of the subject, and including means for combining selected ones of the animation signals with selected ones of the size signals to produce animated variations in size of the display as one form of animation.

8. The system of claim 5 including means to modulate the intensities of color control grids separately in coincidence with animation of individual sections.

9. The system of claim 5 including means to blank the beam of the display device during positioning of the beam between animation of individual sections.

10. The system of claim 5 including means to vary the number of individual sections to be animated.

11. A system for producing an animated display of a subject comprising a display device, the display device having a movable beam, means to establish intensity modulations and sweep program signals for the beam of the display device corresponding to reproduction of the subject, means to generate animation signals, means to combine the animation signals with the sweep program signals to animate the display, and means to vary over time the degree to which the animation signals are combined with the sweep program signals in animating the display.

12. A method of animating a scene as displayed on the display screen of a display device comprising the steps of establishing the horizontal and vertical sweeps of the display beam for reproduction of the scene, generating signals for modulating horizontal and vertical sweeps of the display beam in accordance with the animation sequence desired, combining the modulating signals with the horizontal and vertical sweep signals, and varying over time the degree to which the modulating signals are combined with the horizontal and vertical sweep signals.

13. A method of animating a scene as displayed on the display screen of a display device comprising the steps of establishing the horizontal and vertical sweeps of the display beam for reproduction of the scene divided into a select number of sections, generating signals for modulating the horizontal and vertical sweeps of the display beam in accordance with the animation sequence desired, and selectively combining the modulating signals with the horizontal and vertical sweep signals corresponding to the individual sections of the scene.

14. The method of claim 13 including the step of adjusting the duration of the combination of the modulating signals with the horizontal and vertical sweep signals.

15. The method of claim 13 including the step of blanking the beam of the display device during switching between animation of individual sections of the scene.

16. The method of claim 13 including the step of varying over time the degree to which the the modulating signals are combined with the horizontal and vertical sweep signals.

17. A computer animation system comprising means to generate signals corresponding to initial position of a subject on a display tube, means to generate signals corresponding to final position of the subject on a display tube, means to generate signals corresponding to an animation pattern of movement of the subject from initial to final position, means to combine the initial position signals, final positions signals and animation pattern signals to control the position of the subject on a display tube as a function of such combination of signals, and means to vary the magnitude of influence of one or more of the individual signals on the combination of signals.

18. The computer animation system of claim 17 including means to generate the said signals for individual sections of the subject, and means to combine the said signals for each individual section.

19. The computer animation system of claim 18 including commutators for regulating the sequence of signal generation and signal combination corresponding to the sections of the subject.

20. The computer animation system of claim 19 including a section sequence control network having means for establishing the number of sections and means for establishing the relative size of each section.

21. The computer animation system of claim 17 including a video camera for generating video signals representing the subject, and a display tube having deflection and video inputs, the video signals and combination of signals being applied to the video and deflection inputs respectively of the display tube for displaying the output from the computer animation system.

22. The computer animation system of claim 17 wherein the means to vary the influence of the individual signals includes a generator for generating a ramp signal, and means to multiply the initial position signals by the ramp signal prior to the said combination.

23. The computer animation system of claim 22 including means to multiply the animation pattern signal by the ramp signal prior to the said combination.

24. The computer animation system of claim 22 wherein the ramp signal is characterized as having a decreasing slope.

25. The computer animation system of claim 17 including means to vary the animation pattern signals.

26. A method of producing an animation sequence of a subject from a single still view of the subject comprising the steps of generating video signals representing each part of the subject as selectively divided into one or more parts; reproducing each of said parts of the subject on a separate raster section generated from parameter signals defining its size, shape, and position, the generation of each raster section being synchronized with the generation of the video signals representing the part of the subject produced thereon; and selectively modulating selected ones of the parameter signals to produce changes in selected ones of the raster sections; thereby producing corresponding changes in the parts of the subject reproduced thereon.

27. A method of producing an animation sequence of a subject from a single still view of the subject comprising the steps of scanning each part of the subject as selectively divided into one or more parts to produce video signals representing each part, generating parameter signals defining the size, shape, and position of a raster section for each of said parts of the subject, combining the parameter input signals to generate, in synchronization with the generation of the video signals representing each part of the subject, time varying coordinate signals defining a raster section, modulating the intensity of the electron beam of an electron beam device with the video signals representing each part of the subject while simultaneously directing the scan pattern of the electron beam with the coordinate signals produced in synchronization therewith to reproduce each part of the subject on a separate raster section, and selectively modulating selected ones of the parameter input signals, thereby producing corresponding changes in the scanning patterns of the electron beam, the raster sections produced thereby and the parts of the subject produced thereon.

28. A system for generating an animated image comprising analog network means having analog inputs and analog outputs, means associated with the analog network means for combining signals at its inputs to produce time varying coordinate signals at its outputs representing a particular scan pattern, means for establishing input signals at the analog inputs representing an initial scan pattern, means for establishing input signals at the analog inputs representing a final scan pattern, and means to selectively modulate the input signals for a selected duration of time to produce time varying coordinate output signals representing continuously changing scan patterns between initial and final scan patterns.

29. The system of claim 28 including means for generating video signals representing each part of a subject divided into a select number of parts, and means for producing a display of the subject in response to the video and time varying coordinate signals.

* * * * *